(12) United States Patent
Boidot

(10) Patent No.: US 10,703,012 B2
(45) Date of Patent: Jul. 7, 2020

(54) TOOL FOR DIFFERENTIAL COMPRESSION OF A POWDER MATERIAL, INCLUDING A DEFORMABLE MEMBRANE

(71) Applicant: COMMISSARIAT A L'ENERGIE ATOMIQUE ET AUX ENERGIES ALTERNATIVES, Paris (FR)

(72) Inventor: Mathieu Boidot, Gieres (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 574 days.

(21) Appl. No.: 15/371,855

(22) Filed: Dec. 7, 2016

(65) Prior Publication Data

US 2017/0157795 A1  Jun. 8, 2017

(30) Foreign Application Priority Data

Dec. 8, 2015  (FR) .................................... 15 61979

(51) Int. Cl.
  *B23B 3/00*  (2006.01)
  *B28B 3/00*  (2006.01)
  (Continued)

(52) U.S. Cl.
  CPC .............. *B28B 3/003* (2013.01); *B30B 11/02* (2013.01); *C04B 35/58085* (2013.01);
  (Continued)

(58) Field of Classification Search
  CPC ... B28B 3/003; B30B 11/02; C04B 35/58085; C04B 35/645; C04B 2235/775
  See application file for complete search history.

(56) References Cited

U.S. PATENT DOCUMENTS 5,489,343 A  *  2/1996  Uchida ................. B22F 1/0059
                                                148/101
6,355,210 B1    3/2002  Hirabayashi
2009/0123690 A1 * 5/2009  Scholl .................. B22F 1/0003
                                                428/97

FOREIGN PATENT DOCUMENTS

CN      202715824      2/2013
EP      2 052 800 A1   4/2009
              (Continued)

OTHER PUBLICATIONS

Zamanipour, Z. et al. "Synthesis, characterization, and thermoelectric properties of nanostructured bulk p-type MnSi." 2012. Ceramics International. 39. 2353-2358. (Year: 2012).*
(Continued)

*Primary Examiner* — Colleen P Dunn
*Assistant Examiner* — Nicholas A Wang
(74) *Attorney, Agent, or Firm* — Oblon, McClelland, Maier & Neustadt, L.L.P.

(57) ABSTRACT

A tool to differentially compress a powder material comprises a differential compression piston and a support. The piston comprises a first part configured to apply a pressure on a first region of an external surface of the powder material. The piston comprises a second part with a recess which is located at a lateral distance from the first part and which is configured to face a second region of the external surface of the powder material. The tool further comprises a membrane that can be deformed by the piston. The deformable membrane is configured to at least partially retain the powder material in the tool.

12 Claims, 4 Drawing Sheets

(51) Int. Cl.
*B30B 11/02* (2006.01)
*C04B 35/58* (2006.01)
*C04B 35/645* (2006.01)

(52) U.S. Cl.
CPC .... *C04B 35/645* (2013.01); *C04B 2235/3891* (2013.01); *C04B 2235/66* (2013.01); *C04B 2235/775* (2013.01)

(56) References Cited

FOREIGN PATENT DOCUMENTS

| | | | |
|---|---|---|---|
| FR | 2 969 016 | | 6/2012 |
| JP | S6077658 | * | 5/1985 |
| JP | 3-94998 A | | 4/1991 |
| JP | H0394998 | * | 4/1991 |
| JP | 2000-317696 A | | 11/2000 |

OTHER PUBLICATIONS

French Preliminary Search Report dated Sep. 20, 2016 in French Application 15 61979 filed on Dec. 8, 2015 (with English Translation of Categories of Cited Documents).

* cited by examiner

TOOL FOR DIFFERENTIAL COMPRESSION OF A POWDER MATERIAL, INCLUDING A DEFORMABLE MEMBRANE

TECHNICAL DOMAIN

The invention relates to manufacturing of an element by sintering and by differential compression of a powder material. The element made is specifically a washer for a thermoelectric module, capable of resisting the temperature of exhaust gases from a vehicle.

STATE OF PRIOR ART

Patent application EP 2 052 800 discloses a tool for differential compression of a previously sintered element blank. The blank is made from steel containing from 0.5 to 2% by mass of molybdenum.

The blank is placed facing a first part of a piston that is separated from a second part of the piston by a step. This step is intended to limit material displacements inside the blank during differential compression applied by the piston.

The first part is used to make a higher density region of the element and the second part is used to make a lower density region of the element.

The method used to manufacture the element requires sintering of the metal powder before the differential compression step of the blank so as to prevent dispersion of powder during the differential action of the piston, and this makes it longer and fairly expensive to manufacture the element.

Consequently there is a need to simplify manufacturing of an element from a powder material, while limiting material flows during manufacturing of the element.

PRESENTATION OF THE INVENTION

The invention is intended to at least partially solve problems encountered in solutions according to prior art.

Consequently, the purpose of the invention is a tool to differentially compress a powder product.

The tool comprises a differential compression piston and a support for the powder material. The differential compression piston comprises a first part and a second part. The support is located on a side opposite to the differential compression piston with respect to the powder material.

The differential compression piston and the support are configured so that the first part applies a first pressure on a first region of an external surface that delimits the powder material, the second part comprising a recess at a lateral distance from the first part and configured to face a second region of the external surface of the powder material.

According to the invention, the tool comprises a membrane that can be deformed by the differential compression piston, the deformable membrane being configured to at least partially retain the powder material in the tool.

The tool can manufacture an element made of a powder material by performing a sintering step simultaneously and/or after a differential compression step of the powder material.

The membrane retains the powder material and helps to control the shape of the element made, during the differential compression.

The membrane is intended particularly to be located between the powder material and the differential compression piston, along the direction of the piston displacement.

In particular, the membrane is configured to deform facing the second region under the action of the powder material, when the powder material is compressed in the first region and the membrane has no contact with the second region.

The tool according to the invention thus eliminates the need for a preliminary sintering step on the powder material, to apply differential compression of the blank obtained.

The invention may optionally include one or more of the following characteristics, that may or may not be combined with each other.

Preferably, the second region is at least partially inside the first region. In particular, the second region is at least partially surrounded by the first region.

Preferably, the dimension of the recess between the second part and the first part remains constant, particularly during actuation of the piston.

Advantageously, the second part includes a setback portion forming a second stage of the piston and offset from the recess relative to the first part that forms a first stage of the piston and/or the second part comprises a through hole.

According to one particular embodiment, the second part comprises a non-flat surface that is configured to face the powder material.

According to one advantageous embodiment, the first part comprises a non-flat surface that is configured to face the powder material.

According to one particularly advantageous embodiment, the differential compression piston is rotationally symmetrical about an axis of the tool.

According to another particular embodiment, the second part is located radially inwards from the first part towards the tool axis.

As a variant, the second part may in particular be located radially outwards from the first part.

Advantageously, the support comprises a piston configured to apply a uniform pressure on the external surface of the powder material. Or the support comprises a differential compression piston configured to apply a pressure on the first region different from the pressure on the second region.

According to one special embodiment, the tool comprises means of heating to sinter the powder material, preferably during differential compression of the powder material.

According to another particular embodiment, the deformable membrane comprises a flexible sheet preferably including a metallic material and/or graphite.

The invention also applies to a method of manufacturing an element by differential compression of a powder material using a tool like that defined above.

The method includes a step of sintering and compressing a first region of an external surface of the powder material, a second region of the external surface of the powder material facing the second part of the tool, so as to make the element with an external surface comprising a first region with a higher density than a second region of the external surface of the element, the powder material being located between the support and the membrane, the membrane being mechanically deformed during compression applied by the first part and by reaction of the powder material on the membrane facing the recess.

According to one particular embodiment, the powder material comprises manganese or tin silicide, preferably electrically doped, very preferably a silicide with formula $MnSi_{1.77}$ and/or $Mg_2Si_xSn_{1-x}$, where x is between 0.2 and 0.8.

The thermal conductivity of manganese and tin silicides is sufficiently high to resist the temperature of exhaust gases from a vehicle.

According to one advantageous embodiment, the manufactured element is preferably a washer, the method comprising sintering and compression step in the manufacturing method as defined above, and including a machining step of the second region. Machining of this second region is facilitated by its lower density.

BRIEF DESCRIPTION OF THE DRAWINGS

This invention will be better understood after reading the description of example embodiments given purely for information and that are in no way limitative with reference to the appended drawings on which.

DETAILED PRESENTATION OF PARTICULAR EMBODIMENTS

Identical, similar or equivalent parts of the different figures have the same numeric references to facilitate comparison between the different figures.

Figure 1A:
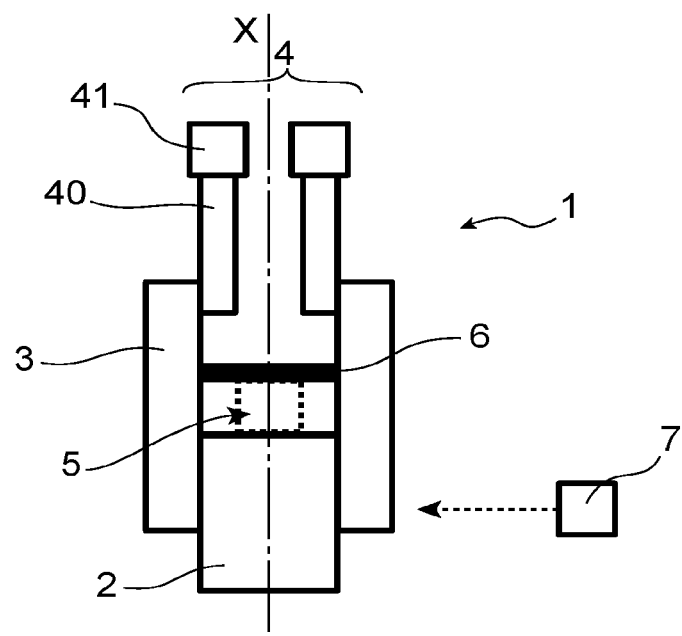
FIG. 1a is a diagrammatic view of a first embodiment of a tool for the differential compression of a powder material.
Figure 1B:
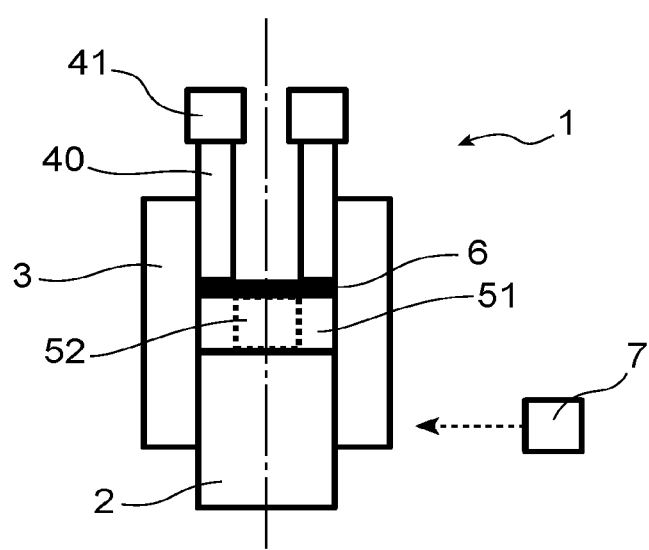
FIG. 1b is a diagrammatic view of the first embodiment of the tool, before compression of the powder material.
Figure 1C:
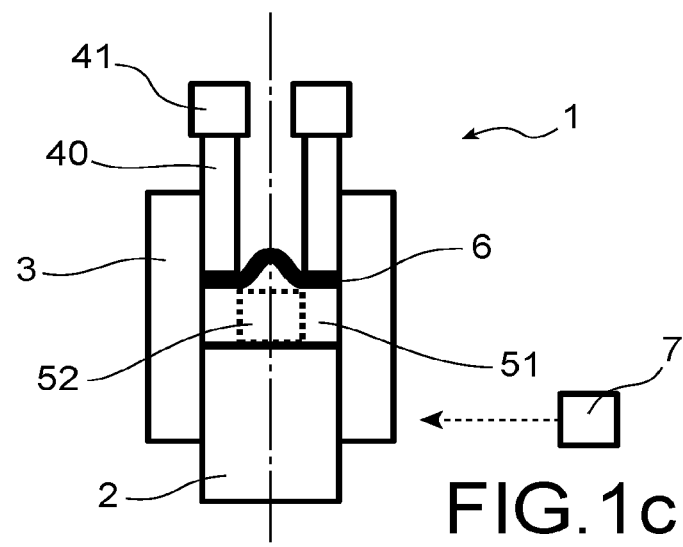
FIG. 1c is a diagrammatic view of the first embodiment of the tool, at the end of compression of the powder material.

FIGS. 1a to 1c show a tool 1 for the differential compression of a powder material 5 according to a first embodiment.

The powder material 5 comprises a metallic powder comprising tin and/or manganese silicide, according to the formula $MnSi_{1.77}$ and/or $Mg_2Si_xSn_{1-x}$, where x is between 0.2 and 0.8. These materials are electrically doped and they are chosen such that their electrical conductivity is high, their thermal conductivity is low and their Seebeck coefficient is high. On the other hand, it is difficult to manufacture elements 50, 56 using these materials due to their high coefficient of thermal expansion.

The tool 1 comprises a lower piston 2, an upper piston 4 and a side wall 3 partially surrounding the lower piston 2 and the upper piston 4.

The lower piston 2 and the upper piston 4, and the side wall 3 are located inside a thermally insulated chamber 7, that includes "flash" sintering equipment, a microwave heating unit or an oven.

The thermally insulated chamber 7 forms heating means designed to sinter the powder material 5 at the same time as differential compression is being applied.

Figure 3:
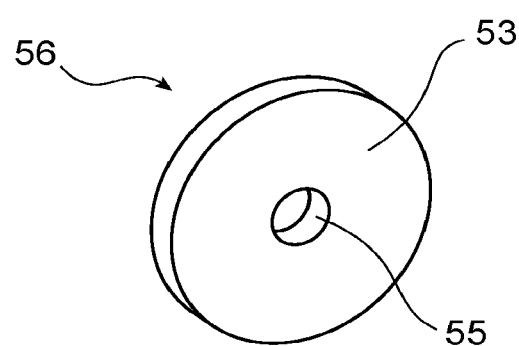
FIG. 3 is a three-quarter front view of a washer made after machining a low density region of a washer blank.

Tool 1 is symmetric in revolution about a longitudinal axis X-X of the tool corresponding to the longitudinal axis of the washer 56 that can be seen on FIG. 3, that is made from the powder material 5.

Throughout the remainder of this presentation and if not mentioned otherwise, a longitudinal direction is a direction parallel to the longitudinal axis X-X of the tool and a lateral direction is a direction orthogonal to the longitudinal axis X-X of the tool.

Furthermore, the adjectives "upper" and "lower" are defined relative to the powder material 5 when it is placed in the tool 1, with reference to the longitudinal direction X-X.

The powder material 5 is located between the lower piston 2 and the upper piston 4. It is entirely surrounded by the side wall 3. Its upper part is also surrounded by a deformable membrane 6 located between the powder material 5 and the upper piston 4.

The lower piston 2 is located on the opposite side of the powder material 5 from the upper piston 4 along the longitudinal axis X-X. It is configured to uniformly compress the upper surface of the powder material 5 and it is delimited by a plane upper surface facing a lower surface of the powder material 5. The lower piston 2 acts as a support for the powder material 5.

The upper piston 4 is a differential compression piston 4 configured to non-uniformly compress the upper surface of the powder material 5. It is moved by a mechanical or hydraulic actuator 41, typically a motor.

The upper piston 4 comprises a first part 40 in the form of an annular crown that is delimited by a recess at its center. The crown 40 has a plane lower surface facing the powder material 5.

It also comprises a through hole 43 at the center of the crown 40. This through hole 43 forms the recess of the differential compression piston 4 and forms a second part of the differential compression piston 4.

The crown 40 is facing a first region 51 delimited by the upper surface of the powder material 5. The crown 40 will apply a first pressure on the first region 51 that is higher than the pressure applied by the tool 1 on a second region 52 delimited by the upper surface of the powder material 5 facing the through hole 43.

The pressure applied by the tool 1 on the second region 52 of the powder material 5, called the second pressure, is the pressure exerted by the deformable membrane 6 on the powder material 5 at this location.

The membrane 6 extends over the entire surface of the differential compression piston 4, including along the crown 40, matching the edges of the internal surface of the tool 1 that is delimited by the side wall 3.

The deformable membrane 6 is made in the form of a flexible sheet from a metallic material including for example steel, molybdenum, niobium, tungsten and/or platinum. It may also be a sheet of paper containing graphite. The thickness, the material and the mass of the membrane 6 are determined so that it can be deformed under the action of the differential compression piston 4 and by reaction of the powder material 5.

In particular, the membrane 6 applies the second pressure on the powder material when it is compressed by the crown 40 on one side and is subjected to a pressure force by the powder material 5 facing the through hole 43 on the other side. The membrane 6 deforms facing the through hole 43 under the action of the powder material 5 and the compression applied in the first region 51 on the powder material 5.

It retains the powder material 5 in the tool, it controls displacements of the powder material 5 between the first region 51 and the second region 52, and applies a second non-zero pressure on the powder material 5.

Figure 2:
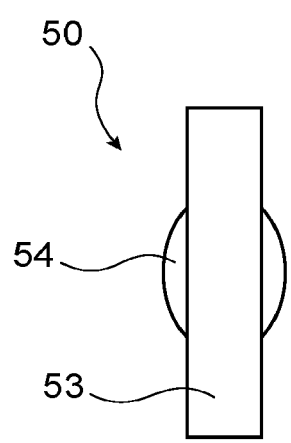
FIG. 2 is a sectional view of a washer blank made using the differential compression tool.

The tool 1 can be used to make an element, typically a washer blank 50 like that shown on FIG. 2, with a first region 53 with high density obtained by compression of the first region 51 of the powder material 5 by the crown 40, and a second region 54 with low density obtained by compression of the second region 52 of the powder material 5 by the membrane 6.

The washer blank 50 is obtained using a manufacturing method that is described once again with reference to FIGS. 1a to 1c.

Firstly, the powder material 5 is placed on the lower piston 2 that acts as support for the powder material 5. The deformable membrane 6 is then placed on the powder material 5 to cover it.

In FIG. 1b, the upper piston 4 then comes into mechanical contract with the membrane 6.

In FIG. 1c, the upper piston 4 and the lower piston 2 then each apply a compression force on the powder material 5 that is simultaneously heated.

The powder material 5 is sintered in the tool 1 at a temperature between 650° and 1050°.

When this material 5 comprises manganese silicide with formula $MnSi_{1.77}$, sintering is done at between 900° C. and 1050° C., preferably approximately 950° C.

When the powder material 5 comprises manganese and tin silicide with formula $Mg_2Si_xSn_{1-x}$, where x is between 0.2 and 0.8, sintering is done at a temperature of between 650° C. and 800° C., preferably approximately 720° C.

The first region 51 of the powder material 5 is pressurized at between 30 MPa and 80 MPa, preferably about 35 MPa.

The first region 51 is compressed along the direction of the longitudinal axis X-X firstly by the crown 40 of the differential piston and secondly the lower piston 2.

The second region 52 of the powder material 5 is compressed along the direction of the longitudinal X-X axis by the deformable membrane 6, particularly at the through hole 43. The membrane 6 is then deformed upwards, partially filling the through hole 43, at the second region 52 of the powder material 5.

At the end of the sintering and differential compression step, the powder material is in the form of a washer blank 50 as shown on FIG. 2.

This blank 50 comprises a high density region 53 corresponding to the first region 51 of powder material 5 and a low density region 54 corresponding to the second region 52 of the powder material 5.

The density of the high density region 53 is higher than the density of the low density region 54, particularly because the densification rate of the powder material 5 is closely dependent on the pressure applied to it.

The ratio between the density of the high density region 53 and the maximum theoretical density of the powder material 5 may for example by between 92% and 100%. The density of the low density region 54 may for example be between 75% and 85%.

The densification rate of the powder material 5 at 950° C. varies for example from $6.5*10^{-4}$ $s^{-1}$ to $1.2*10^{-6}$ $s^{-1}$, when the pressure applied on the powder material 5 varies from zero pressure to a pressure of about 35 MPa. In other words, the densification rate of the powder material is about 540 times faster when the applied pressure is 35 MPa than when no pressure is applied to the powder material 5.

Therefore differential compression of the powder material 5 during sintering efficiently controls the density of the high density region 53 relative to the low density region 54.

The low density region 54 is then machined to make a through hole 55 in it and final machining is done on the low density region 53. The difference in density between the regions 53, 54 limits precautions to be taken when machining the through hole 55 in the low density region 54.

The washer 56 obtained after machining the blank 50, visible on FIG. 3, has a better finish quality than a washer that would be obtained from a blank with a uniform density after sintering the powder material 5.

This semiconducting washer 56 can be used to manufacture a thermoelectric module for an automobile vehicle. It is designed to resist the temperature of exhaust gases.

Figure 4:
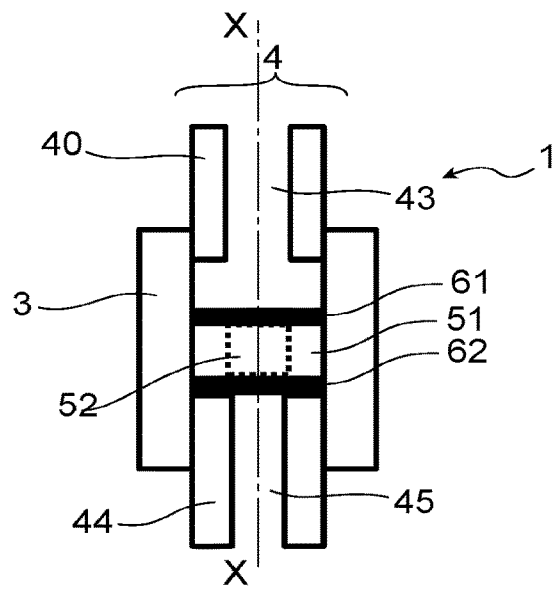
FIG. 4 is a diagrammatic view of a second embodiment of a tool for the differential compression of a powder material.

The embodiment in FIG. 4 is different from that shown in FIGS. 1a to 1c in that the lower piston 2 is a differential compression piston instead of a piston configured to apply a uniform pressure on the lower surface of the powder material 5.

The tool 1 also includes a lower deformable membrane 62 located between the lower outer surface of the powder material 5 and the upper surface of the lower piston 2.

The lower piston 2 comprises a lower crown 44 around the longitudinal axis X-X and a through hole 45 at the center of the lower crown 44. The lower crown 44 has a plane upper surface that is configured to be in contact with the lower surface of the powder material 5.

The lower crown 44 is facing the crown 40 on the upper piston 4, these two crowns 40, 44 being located on opposite sides of the deformable membranes 61, 62 along the longitudinal direction X-X.

The upper crown 44 is identical to the crown 40 of the upper piston 4. It forms a first part of the lower piston 2 configured to apply a first pressure on a first region delimiting the lower surface of the powder material 5. This first region is coincident with the region delimited by the crown 40 of the upper piston 4.

The through hole in the lower piston 2 is facing the through hole 43 in the upper piston 4, on the other side of the powder material 5. It forms a recess in the lower piston 2 and forms a second part of this differential compression piston.

The lower membrane 62 will then apply a second pressure, less than the first pressure applied by the lower crown 44, during differential compression of the powder material 5, under the action of the lower crown 44 and the reaction of the powder material 5.

The lower deformable membrane 62 is identical to the upper deformable membrane 61. The material used and the shape of these membranes 61, 62 are identical to those for the deformable membrane 6 in the first embodiment of the invention.

Figure 5:
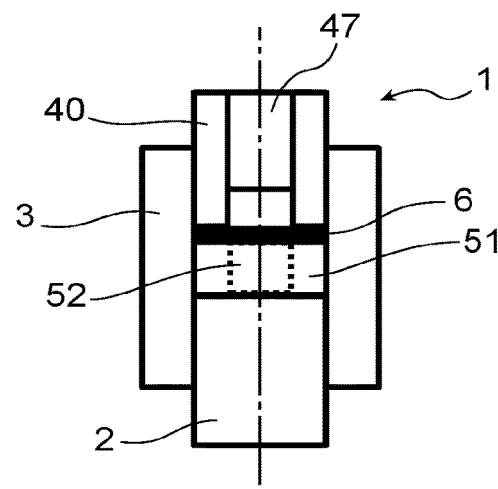
FIG. 5 is a diagrammatic view of a third embodiment of a tool for the differential compression of a powder material.

The embodiment shown in FIG. 5 is different from the first embodiment due to the shape of the second part of the upper piston 4.

The though hole 43 is replaced by a recess and a setback portion 47 that is further from the upper surface of the powder material 5 than the crown 40, when the tool 1 is at rest. This recess and this setback portion 47 are located at the center of the crown 40.

The crown 40 forms a first stage of the differential compression piston 4, and the setback portion 47 forms a second stage of the differential compression piston 4 that is offset from the height of the recess in the first stage along the longitudinal axis X-X.

The setback portion 47 is delimited by a plane lower surface that is configured to limit upwards deformations of the deformable membrane 6 during differential compression of the powder material 5. This setback portion 47 is designed particularly to come into mechanical contact with the deformable membrane 6.

The membrane 6 deforms facing the setback portion 47 under the action of the powder material 5 and the compression applied in the first region 51, before coming into contact with the setback portion 47.

The setback portion 47 makes it easier to control the shape of the lower density second region 54 of the blank 50 produced. Especially, it enables better control over material flows from the first region 51 to the second region 52, during differential compression of the powder material 5.

Figure 6:
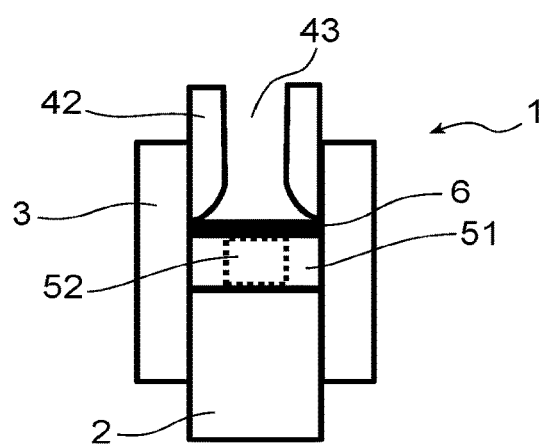
FIG. 6 is a diagrammatic view of a fourth embodiment of a tool for the differential compression of a powder material.

FIG. 6 represents a fourth embodiment of the tool 1. This embodiment is different from the first embodiment due to the shape of the crown 42 of the upper piston 4.

The lower part of the crown 42 is delimited by a non-plane lower surface. This lower surface that is facing the deformable membrane is curved downwards towards the outside of the tool, and towards the side wall 3.

The non-plane shape of the crown 42 is aimed to make it easier to machine the through hole 55 in the low density region 54 of the blank 50, to make the washer 56.

Figure 7:
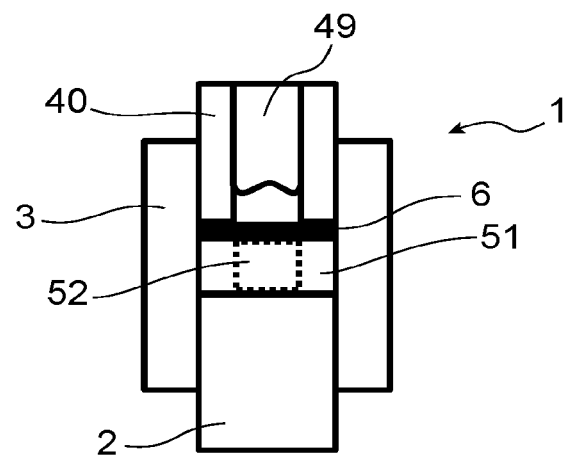
FIG. 7 is a diagrammatic view of a fifth embodiment of a tool for the differential compression of a powder material.

FIG. 7 shows a fifth embodiment that is different from the third embodiment represented in FIG. 5 by the shape of the lower surface of the setback portion.

The portion in relief 49, that forms the second stage of the upper piston 4, remains offset from the height of the recess along the longitudinal axis X-X relative to the crown 40 that forms the first stage of the upper piston 4. The portion in relief 49 is always at the center of the crown 40.

Nevertheless, the portion in relief 49 has a undulating lower surface instead of the plane lower surface of the setback portion 47 in the third embodiment.

The undulating lower surface of the portion in relief 49 is particularly advantageous when its area is large in comparison with the area of the crown 40.

Figure 8:
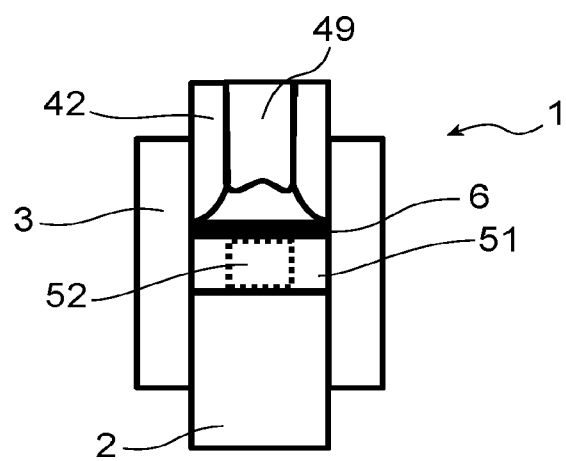
FIG. 8 is a diagrammatic view of a sixth embodiment of a tool for the differential compression of a powder material.

FIG. 8 shows a sixth embodiment that is different from the fifth embodiment due to the non-plane shape of the lower surface of the crown 40 of the upper piston 4.

The lower surface of the crown 40 is curved downwards towards the outside of the tool, and towards the side wall 3. This lower surface is configured to face the deformable membrane 6 and its shape is similar to the shape of the lower surface of the crown in the fourth embodiment of the tool 1.

Obviously, an expert in the subject can make various modifications to the invention as it has just been described without going outside the framework of the invention.

The shape of the first part 40, 42 and the shape of the second part 43, 47 are determined as a function of the shape of the element 50, 56 to be manufactured, it being understood that the shape of the tool would be different if it were required to make elements other than washers.

As a variant of the second embodiment (not shown), the lower crown 44 could be offset from the crown 40 of the upper piston 4 along a lateral direction of tool 1.

In particular, the lower crown 44 could face the through hole 43 in the upper piston 4, the through hole 45 then facing the crown 40 of the upper piston 4.

Furthermore, the shape of the lower crown and the material from which it is made could be different from those for the crown 40 of the upper piston 4. Similarly, the through hole 45 in the lower piston 2 could be replaced by a setback portion that would be similar to that used in the third embodiment. Moreover, the upper portion of this setback portion may or may not be plane.

The upper surface of the lower crown 44 could also be not plane, like the lower surface of the crown 40 in the fourth embodiment.

The invention claimed is:

1. A method for manufacturing an element by sintering and by differential compression of a powder material by means of a tool to differentially compress a powder material, wherein the tool comprises:
   a differential compression piston comprising a first part and a second part, and
   a support for the powder material, that is configured to be on a side opposite to the differential compression piston with respect to the powder material,
   wherein the differential compression piston and the support are configured so that the first part applies a first pressure on a first region of an external surface that delimits the powder material,
   wherein the second part comprises a recess which is at a lateral distance from the first part and wherein the recess is configured to face a second region of the external surface of the powder material,
   wherein the tool further comprises a membrane that is deformable by the action of the differential compression piston,
   wherein the deformable membrane is configured to at least partially retain the powder material in the tool relative to the second part, when the deformable membrane is located between the powder material and the differential compression piston and when the deformable membrane is deformed during the compression applied by the first part and by reaction of the powder material on the membrane facing the recess,
   wherein the second part is motionless relative to the first part, so as to make an element with an external surface comprising a first region with a higher density than a second region of the external surface of the element,
   wherein the method comprises:
       sintering and compressing, with the tool, the first region of the external surface of the powder material and the second region of the external surface of the powder material facing the second part of the tool, so as to make an element with an external surface comprising a first region with a higher density than a second region of the external surface of the element,
       wherein the powder material is located between the support and the membrane, the membrane being mechanically deformed during the compression applied by the first part and by reaction of the powder material on the membrane facing the recess.

2. The method according to claim 1, in which the powder material comprises manganese or tin suicide.

3. The method according to claim 2, in which the powder material comprises electrically doped manganese or electrically doped tin silicide.

4. The method according to claim 2, in which the powder material comprises a silicide with formula $MnSi_{1.77}$ and/or $Mg_2Si_xSn_{1-x}$ where x is between 0.2 and 0.8.

5. The method according to claim 1 for manufacturing a washer, including a machining step of the second region.

6. The method according to claim 1, in which the second part includes a setback portion forming a second stage of the piston, wherein the setback portion is offset from the recess relative to the first part forming a first stage of the piston.

7. The method according to claim 1, in which the second part comprises a through hole.

8. The method according to claim 1, in which the support comprises a piston configured to apply a uniform pressure on the external surface of the powder material.

9. The method according to claim 1, in which the support comprises a differential compression piston configured to apply a pressure on the first region different from the pressure on the second region.

10. The method according to claim 1, in which the differential compression piston is rotationally symmetrical about a longitudinal axis of the tool.

11. The method according to claim 1, in which the deformable membrane comprises a flexible sheet.

12. The method according to claim 1, in which the flexible sheet includes a metallic material and/or graphite.

* * * * *